US010821949B2

(12) United States Patent
Henriques et al.

(10) Patent No.: US 10,821,949 B2
(45) Date of Patent: Nov. 3, 2020

(54) ELECTRONIC BRAKE BOOST ON SECONDARY BRAKE SYSTEM (71) Applicant: Continental Automotive Systems, Inc., Auburn Hills, MI (US)

(72) Inventors: Pedro Henriques, Rochester Hills, MI (US); Richard Davis, Orion, MI (US); Krutarth Swadia, Orion, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/183,029

(22) Filed: Nov. 7, 2018

(65) Prior Publication Data
US 2020/0139947 A1  May 7, 2020

(51) Int. Cl.
*B60T 8/40* (2006.01)
*B60T 8/34* (2006.01)

(52) U.S. Cl.
CPC ............ *B60T 8/4013* (2013.01); *B60T 8/344* (2013.01); *B60T 8/4004* (2013.01); *B60T 8/404* (2013.01)

(58) Field of Classification Search
CPC ........ B60T 7/12; B60T 17/221; B60T 8/4081; B60T 2270/402; B60T 2270/403
See application file for complete search history.

(56) References Cited

U.S. PATENT DOCUMENTS

| 6,227,628 | B1 * | 5/2001 | Emmann ............... | B60T 11/224 303/114.1 |
| 6,256,570 | B1 * | 7/2001 | Weiberle ............... | B60T 7/042 188/170 |
| 8,177,306 | B2 * | 5/2012 | Cadeddu ............... | B60T 17/18 188/345 |
| 9,296,370 | B2 * | 3/2016 | McClain ............... | B60T 7/042 |
| 9,776,607 | B2 | 10/2017 | Brenn et al. | |
| 2008/0232015 | A1 * | 9/2008 | Wakabayashi ......... | B60T 8/321 361/79 |

(Continued)

FOREIGN PATENT DOCUMENTS

| DE | 102018202884 A1 | 8/2019 |
| WO | 2017205629 | 11/2017 |

OTHER PUBLICATIONS

Search Report dated Jul. 23, 2020 from corresponding German Patent Application No. DE 10 2019 216 896.5.

*Primary Examiner* — Bradley T King
*Assistant Examiner* — James K Hsiao (57) ABSTRACT A braking system for a vehicle, which includes both a primary brake system, and a secondary brake system. A plurality of braking units are controlled by the primary brake system when the primary brake system is active, and at least one of the plurality of braking units controlled by the secondary brake system when the primary brake system is inactive. An actuator is part of the primary brake system, and the actuator is controlled by a primary controller. The primary controller selectively actuates the actuator to control the fluid pressure in the primary brake system to selectively actuate the plurality of braking units when the primary brake system is active, and when the primary brake system is inactive, the secondary brake system generates a boost pressure in the at least one of the plurality of braking units controlled by the secondary brake system.

20 Claims, 2 Drawing Sheets (56) References Cited

U.S. PATENT DOCUMENTS

| | | | |
|---|---|---|---|
| 2009/0091180 A1* | 4/2009 | Iwasaki | B60T 8/171 303/11 |
| 2013/0062932 A1* | 3/2013 | Yagashira | B60T 8/442 303/3 |
| 2015/0203082 A1* | 7/2015 | Forster | B60T 7/08 701/70 |
| 2016/0009257 A1* | 1/2016 | Joyce | B60T 17/221 701/70 |
| 2016/0034367 A1* | 2/2016 | Kopetz | G05B 9/03 714/11 |
| 2016/0214595 A1* | 7/2016 | Baehrle-Miller | G05D 1/0088 |
| 2017/0050629 A1* | 2/2017 | Kim | B60T 8/4081 |
| 2017/0282877 A1* | 10/2017 | Besier | B60T 8/4086 |
| 2018/0215368 A1* | 8/2018 | Isono | B60T 7/042 |
| 2018/0290640 A1* | 10/2018 | Johnson | B60T 7/042 |
| 2018/0290642 A1* | 10/2018 | Tschiene | B60T 8/171 |
| 2018/0326965 A1* | 11/2018 | Yamamoto | B60T 8/4059 |

\* cited by examiner

ELECTRONIC BRAKE BOOST ON SECONDARY BRAKE SYSTEM

FIELD OF THE INVENTION

The invention relates generally to a brake system for a vehicle having a primary brake system and a secondary brake system, which includes the functionality to provide a brake boost to the secondary brake system when the primary brake system malfunctions.

BACKGROUND OF THE INVENTION

Vehicles with autonomous driving capabilities are becoming increasingly common. Some vehicles are fully autonomous, and do not require the input of a driver. Other vehicles have various configurations, where the vehicle may be operated based on input from a driver, or the vehicle may be configured to operate as an autonomous driving vehicle. When the vehicle is being operated as an autonomous driving vehicle, the operation of the vehicle, such as steering, turning, acceleration, and braking, are controlled by various components, such as control modules and the like. The control modules receive input from various devices, such as sensors, GPS, and the like, to determine what operations are to be performed based on certain parameters such as local speed limits, oncoming traffic signals, and the speed and location of nearby vehicles. With more vehicles being fully operational without the use of driver input, there is a need to have various fail-safe mechanisms in place to ensure the safety of the driver and any passengers. Many autonomous driving vehicles are equipped with primary brake systems and secondary brake systems, such that in the event of a malfunction in the primary brake system, the vehicle is still able to reduce speed and come to a stop if necessary. For autonomous driving vehicles which incorporate a hydraulic braking system, it is necessary to have the secondary braking system in case there is a malfunction in the primary braking system. However, some secondary brake systems, which use hydraulic pressure to generate braking force, do not generate braking pressure in all four wheels, and are only able to generate braking force to two of the wheels. The secondary brake system only having the ability to generate braking force to two of the wheels may not provide enough braking capability under certain conditions where the vehicle must be stopped quickly. It is therefore necessary to compensate for the loss of braking force.

Accordingly, there exists a need for a braking system which is able to provide a brake boost to a secondary brake system, when the primary brake system malfunctions, to provide sufficient deceleration if the vehicle must be stopped quickly.

SUMMARY OF THE INVENTION

The present invention is a braking system having both a primary brake system and a secondary brake system used for controlling several braking units. All of the braking units provide braking force when the primary braking system is active, and only a portion of the braking units provide braking force when the secondary braking system is active. Because only a portion of the braking units are used by the primary braking system, the secondary braking system is able to compensate for loss of braking force by providing additional boost pressure, such that the desired deceleration is achieved. The additional boost pressure may be obtained from the driver of the vehicle applying force to the brake pedal, or through the use of a virtual driver when the brake system of the present invention is used as part of an autonomous driving vehicle.

In the embodiment where the brake system is not used for an autonomous driving vehicle, such as a large vehicle (i.e., heavy duty trucks), in the case of a malfunction of the primary brake system, the secondary brake system is used to reduce the travel applied to the brake pedal that is necessary to achieve the desired deceleration.

In one embodiment, the present invention is a braking system having a primary brake system and a secondary brake system, where a brake boost is provided to the secondary brake system during conditions where the primary brake system has malfunctioned, such that the secondary brake system is able to achieve sufficient deceleration when needed.

The brake system of the present invention provides additional hydraulic pressure to the secondary brake system when the primary brake system has malfunctioned, such that the secondary brake system has sufficient pressure to achieve desired deceleration of the vehicle.

In one embodiment, the present invention is a braking system for a vehicle, which includes both a primary brake system, and a secondary brake system. A plurality of braking units are controlled by the primary brake system when the primary brake system is active, and at least one of the plurality of braking units controlled by the secondary brake system when the primary brake system is inactive.

A primary controller controls fluid pressure in the primary brake system, and a secondary controller controls fluid pressure in the secondary brake system independently of the primary controller.

An actuator is part of the primary brake system, and the actuator controlled by the primary controller.

The brake system also includes a reservoir in fluid communication with both the primary brake system and the secondary brake system.

A boost pressure is generated by the secondary brake system when the primary brake system is inactive. The primary controller selectively actuates the actuator to control the fluid pressure in the primary brake system to selectively actuate the plurality of braking units when the primary brake system is active, and when the primary brake system is inactive, the secondary brake system generates the boost pressure in the at least one of the plurality of braking units controlled by the secondary brake system.

The secondary brake system includes a motor, at least one pump connected to the motor, where the at least one pump operable for generating the boost pressure to the at least one of the plurality of braking units. The motor and the at least one pump generate the boost pressure to the at least one of the plurality of braking units controlled by the secondary brake system when the primary brake system is inactive.

The braking system also includes a brake pedal, which is part of the primary brake system, and when the primary brake system is active, the driver of the vehicle applies force to the brake pedal to generate braking pressure such that the plurality of braking units are actuated, decelerating the vehicle.

The plurality of braking units includes a first braking, a second braking unit, a third braking unit, and a fourth braking unit. During a first mode of operation, the primary brake system is active such the first braking unit, the second braking unit, the third braking unit, and the fourth braking unit are all controlled by the primary controller, and the secondary brake system is inactive. During a second mode of operation, the secondary brake system is active such that the secondary controller controls the third braking unit and the fourth braking unit, and the primary brake system is inactive.

During the second mode of operation, the driver of the vehicle applies force to the brake pedal to generate braking pressure such that the first braking unit and the second braking unit are actuated to generate braking force, and the secondary controller configures the secondary brake system to generate the boost pressure to actuate the third braking unit and the fourth braking unit to generate braking force, and the braking force of the first braking unit and the second braking unit is combined with the braking force generated by the third braking unit and the fourth braking unit to decelerate the vehicle.

When the primary brake system is inactive, the secondary controller commands the motor and the pump to generate the boost pressure independently of the amount of force applied to the brake pedal.

In an embodiment, the vehicle is a fully autonomous driving vehicle. The autonomous driving vehicle includes at least one virtual driver, and the virtual driver provides input to the primary controller to operate the primary brake system when the primary brake system is active, and the secondary controller receives input from the at least one virtual driver when the primary brake system is malfunctioning.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
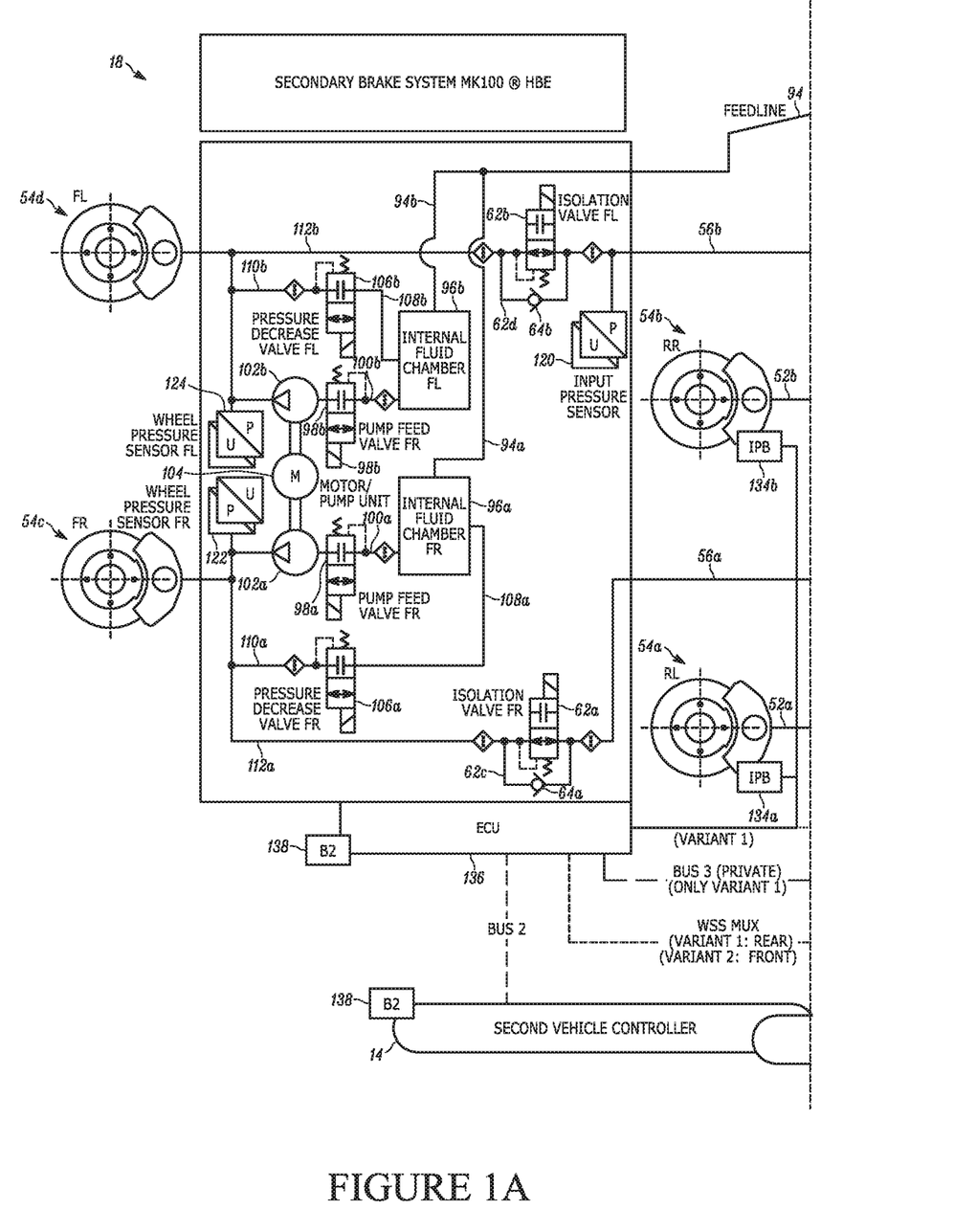
FIG. 1A is a diagram of part of a braking system having a brake boost capability, according to embodiments of the present invention.
Figure 1B:
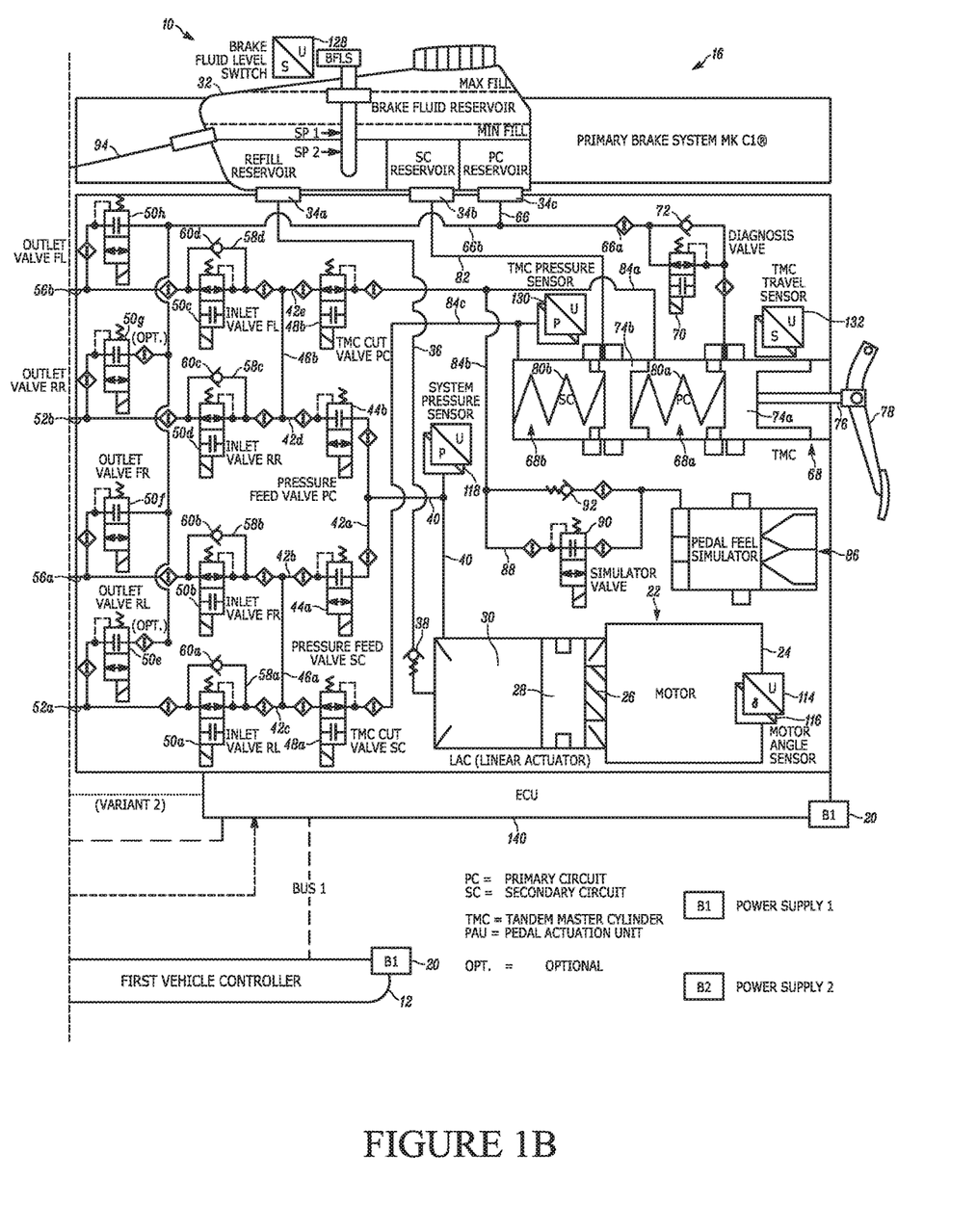
FIG. 1B is diagram of another part of a braking system having a brake boost capability, according to embodiments of the present invention.

A diagram of a braking system according to an embodiment of the present invention is shown in the Figures, generally at 10. The system 10 includes a first vehicle controller 12, and a second, or redundant, vehicle controller 14. The first vehicle controller 12 controls a primary brake system, shown generally at 16, and the second vehicle controller 14 is used to control a secondary brake system, shown generally at 18. During one mode of operation, the primary brake system 16 is active and the secondary brake system 18 is inactive, and during another mode of operation, the secondary brake system 18 is active and the primary brake system 16 is inactive.

The primary brake system 16 includes a battery 20 which is used to supply power to an actuator, shown generally at 22. The actuator 22 in this embodiment is a ball-screw-type of actuator 22, which includes a motor 24, which rotates a shaft 26 to move a piston 28 in a cylinder 30. The actuator 22 is used to circulate fluid in a plurality of conduits. The system 10 also includes a reservoir 32 which includes three connectors 34a,34b,34c. The reservoir 32 is divided into different sections, which are separated by partitions, where each connector 34a,34b,34c provides fluid communication between each section of the reservoir 32 and a corresponding fluid conduit connected to each connector 34a,34b,34c. The first connector 34a is connected to a return conduit 36, which is in fluid communication with the cylinder 30. Disposed in the return conduit 36 is a check valve 38 which allows for fluid in the conduit 36 to transfer to the cylinder 30 as the piston 28 is moved in a first direction towards the motor 24. Also connected to the cylinder 30 is a main feed conduit 40, the main feed conduit 40 is connected to and in fluid communication with a first feed conduit 42a, and the first feed conduit 42a is connected to and in fluid communication with two pressure feed valves 44a,44b. The first pressure feed valve 44a is in fluid communication with a second feed conduit 42b, and the second feed conduit 42b is connected to an in fluid communication with a first transition conduit 46a, and the first transition conduit 46a is connected to and in fluid communication with a third feed conduit 42c. The third feed conduit 42c in connected to and in fluid communication with a first tandem master cylinder (TMC) cut valve 48a and a first anti-lock braking system (ABS) valve 50a. The second feed conduit 42b is also connected to and in fluid communication with a second ABS valve 50b.

The second pressure feed valve 44b is in fluid communication with a fourth feed conduit 42d, the fourth feed conduit 42d is connected to and in fluid communication with a second transition conduit 46b, and the second transition conduit 46b is connected to and in fluid communication with a fifth feed conduit 42e. The fifth feed conduit 42e in connected to and in fluid communication with a second TMC cut valve 48b and a third ABS valve 50c. The fourth feed conduit 42d is also connected to an in fluid communication with a fourth ABS valve 50d.

The first ABS valve 50a is connected to and in fluid communication with a first final conduit 52a, and the first final conduit 52a is also connected to and in fluid communication with a first braking unit, shown generally at 54a. The first final conduit 52a is also connected to and in fluid communication with a fifth ABS valve 50e.

Connected to and in fluid communication with the second ABS valve 50b is a first outlet conduit 56a, and the first outlet conduit 56a is also connected to and in fluid communication with a sixth ABS valve 50f.

The fourth ABS valve 50d is connected to and in fluid communication with a second final conduit 52b, and the second final conduit 52b is also connected to and in fluid communication with a second braking unit, shown generally at 54b. The second final conduit 52b is also connected to and in fluid communication with a seventh ABS valve 50g.

Connected to and in fluid communication with the third ABS valve 50c is a second outlet conduit 56b, and the second outlet conduit 56b is also connected to an in fluid communication with an eighth ABS valve 50h.

Four of the ABS valves 50a,50b,50c,50d also have pressure relief conduits 58a,58b,58c,58d, and a check valve 60a,60b,60c,60d located in a corresponding conduit 58a, 58b,58c,58d.

The system 10 also includes two other braking units 54c,54d, and there are two ABS valves 50a,50b,50c,50d, 50e,50f,50g,50h responsible for providing an anti-lock braking function for each braking unit 54a,54b,54c,54d. More specifically, the first and fifth ABS valves 50a,50e provide the anti-lock braking function for the first braking unit 54a, the second and sixth ABS valves 50b,50f provide the anti-lock braking function for the third braking unit 54c, the fourth and seventh ABS valves 50d,50g provide the anti-lock braking function for the second braking unit 54b, and the third and eighth ABS valves 50c,50h provide the anti-lock braking function for the fourth braking unit 54d.

The second and sixth ABS valves 50b,50f are connected to and in fluid communication with the secondary brake system 18 through the first outlet conduit 56a, and the third and eighth ABS valve 50c,50h are connected to and in fluid communication with the secondary brake system 18 through the second outlet conduit 56b. More specifically, the first outlet conduit 56a is connected to and in fluid communication with a first isolation valve 62a, and the second outlet conduit 56b is connected to and in fluid communication with a second isolation valve 62b. Each of the isolation valves 62a,62b have corresponding pressure relief conduits 62c, 62d, and corresponding check valves 64a,64b. The isolation valves 62a,62b are part of the secondary brake system 18.

In addition to the return conduit 36, also connected to and in fluid communication with the reservoir 32 is an upstream feed conduit 66, the upstream feed conduit 66 branches into two separate secondary feed conduits 66a,66b. One of the secondary feed conduits 66a is connected to and in fluid communication with a tandem master cylinder (TMC), shown generally at 68. More specifically, the secondary feed conduit 66a is in fluid communication with the first cavity, shown generally at 68a, of the TMC 68. There is also a diagnostic valve 70 in fluid communication with the secondary feed conduit 66a, and there is also a check valve 72 disposed in the secondary feed conduit 66a.

Slidably disposed in the TMC 68 is a first piston 74a, and connected to the first piston 74a is a connecting rod 76, and a brake pedal 78 is connected to the connecting rod 76. Disposed in the first cavity 68a and connected to the first piston 74a is a first spring 80a. The first spring 80a is also connected to a second piston 74b, which is also able to move within the TMC 68. Also disposed in the TMC 68 is a second cavity, shown generally at 68b, which is adjacent the second piston 74b. Connected to the second piston 74b and an inner wall of the second cavity 68b is a second spring 80b. The pistons 74a,74b move within the TMC 68 based how much force is applied to the brake pedal 78, the spring rate of each of the springs 80a,80b, and the amount of fluid in each of the cavities 68a,68b. There is also another feed conduit 82 connected to and in fluid communication with the second cavity 68b and the reservoir 32.

Also connected to and in fluid communication with the first cavity 68a is a first primary pressure conduit 84a, and the first primary pressure conduit 84a is connected to and in fluid communication with the second TMC cut valve 48b. Also connected to the first primary pressure conduit 84a is a second primary pressure conduit 84b, and the second primary pressure conduit 84b is connected to and in fluid communication with a pedal feel simulator, shown generally at 86. Connected to the second primary pressure conduit 84b is an additional conduit 88, and disposed in the additional conduit 88 is a simulator valve 90. Located in the second primary pressure conduit 84b is a check valve 92, which is in parallel to the simulator valve 90.

Connected to and in fluid communication with the second cavity 68b is another primary pressure conduit 84c, and the third primary pressure conduit 84c is connected to and in fluid communication with the first TMC cut valve 48a.

Another secondary feed conduit 94 is in fluid communication with the secondary brake system 18, and more specifically splits into two additional conduits 94a,94b, which are connected to and in fluid communication with corresponding reservoirs 96a,96b. The secondary brake system 18 also includes two low-pressure feed valves 98a,98b, which are in fluid communication with the corresponding reservoirs 96a,96b through conduits 100a,100b as shown in FIG. 1A. Each of the low-pressure feed valves 98a,98b is connected to and in fluid communication with a pump 102a,102b, and both pumps 102a,102b are driven by a motor 104.

The secondary brake system 18 also includes excess pressure relief valves 106a,106b which are in fluid communication with the reservoirs 96a,96b through pressure relief conduits 108a,108b as shown in FIG. 1A. There are also two corresponding downstream pressure relief conduits 110a, 110b which are connected to the excess pressure relief valves 106a,106b as shown in FIG. 1A, and the conduits 110a,110b are also connected to and in fluid communication with corresponding cut-valve downstream conduits 112a, 112b. The first cut-valve downstream conduit 112a is connected to and in fluid communication with the first isolation valve 62a, and the second cut-valve downstream conduit 112b is connected to and in fluid communication with the second isolation valve 62b. Each of the cut-valve downstream conduits 112a,112b splits, such that the first cut-valve downstream conduit 112a is in fluid communication with the third braking unit 54c and the first pump 102a, and the second cut-valve downstream conduit 112b is in fluid communication with the fourth braking unit 54d and the second pump 102b.

There are also several sensors used to monitor various operating parameters at different locations in each brake system 16,18. In this embodiment shown in the Figures, there is a position sensor 114 and a temperature sensor 116 for monitoring the position and the temperature of the motor 24. There are also several pressure sensors, one pressure sensor 118 connected to the main feed conduit 40, another pressure sensor 120 connected to one of the outlet conduits 56b, and two pressure sensors 122,124 connected to each corresponding pump 102a,102b. There is also a brake fluid level sensor 128 which is connected to the reservoir 32, which is used for detecting the level of fluid in the reservoir 32. There is also a pressure sensor 130 connected to the third primary pressure conduit 84c. A TMC travel sensor 132 is connected to the TMC 68, for detecting the position of the pistons 74a,74b.

Additionally, there is also a first parking brake unit 134a which is attached to the first, or rear left braking unit 54a, and a second parking brake unit 134b which is attached to the second, or rear right braking unit 54b. The parking brake units 134a,134b are controlled by a secondary controller 136, which is part of the secondary brake system 18. The secondary controller 136 is in electrical communication with the second vehicle controller 14, and both the secondary controller 136 and the second vehicle controller 14 are powered by a battery 138.

The primary braking system 16 also includes a primary controller 140 which is in electrical communication with the first vehicle controller 12, and both the primary controller 140 and first vehicle controller 12 are powered by the battery 20.

In a first mode of operation, when the primary brake system 16 is properly functioning, the motor 24 rotates the shaft 26 to move the piston 28 in the first direction, towards the motor 24, or a second direction, away from the motor 24.

When the piston 28 is moved in the first direction, fluid is drawn into the cylinder 30 from the return conduit 36 and through the check valve 38. When the piston 28 is moved in the second direction, fluid is forced into the main feed conduit 40, and is then forced through the first feed conduit 42a, and if the pressure feed valves 44a,44b are in an open position, the fluid is forced through the feed conduits 42b, 42c,42d,42e, and the transition conduits 46a,46b. When the vehicle is being operated by the driver, the actuator 22 is used to pressurize the primary brake system 16 such that the output of the primary brake system 16 is decoupled from force applied by the driver to the brake pedal 78. When the driver applies a force to the brake pedal 78, pressure and travel readings are made by the TMC pressure sensor 130 and the TMC travel sensor 132, these readings in combination with the pedal feel simulator 86 are used to determine how much pressure is to be generated in the primary brake system 16 by the actuator 22. Additionally, when the vehicle is not being operated as an autonomous driving vehicle (i.e., the vehicle is controlled by the driver) and it is desired to decelerate the vehicle, force is applied to the brake pedal 78 by the driver of the vehicle, which moves both of the pistons 74a,74b, such that fluid is forced from the first cavity 68a, through the first primary pressure conduit 84a, and to the second TMC cut valve 48b, and fluid is also forced from the second cavity 68b through the third primary pressure conduit 84c, and to the first TMC cut valve 48a. The pressurized fluid is then distributed amongst the other conduits, and depending on the configuration of the ABS valves 50a,50b, 50c,50d,50e,50f,50g,50h of the primary brake system 16, pressure is applied to the braking units 54a,54b,54c,54d, such that the braking units 54a,54b,54c,54d decelerate the vehicle.

The vehicle may also operate in an autonomous driving mode, or may be used with a fully autonomous driving vehicle, which does not receive input from a driver. When the vehicle is operating in an autonomous driving mode, the first vehicle controller 12 receives input to determine when and how the primary brake system 16 should be operated. This input may be received from various devices, such as sensors, a LIDAR system, GPS, or other devices which may be used alone or in combination to determine the environment around the vehicle. These devices may function as a "virtual driver," which, based on the surrounding environment (such as the location and speed of nearby vehicles, local traffic ordinances, speed limits, nearby pedestrians, and nearby signs and traffic signals, and weather conditions) send signals providing input to the vehicle in a similar manner to a human driver, to command the controllers 12,14 to operate the primary brake system 16, or the secondary brake system 18, respectively. If it is determined one or more of the braking units 54a,54b,54c,54d needs to be activated, the first vehicle controller 12 sends signals to the primary controller 140 to activate the motor 24.

When the primary controller 140 commands the piston 28 to move in the second direction (as a result of a braking command), fluid is forced into the main feed conduit 40, and is then distributed throughout the other various conduits 42a,42b,42c,42d mentioned above, depending on the configuration of the primary feed valves 44a,44b and the ABS valves 50a,50b,50c,50d,50e,50f,50g,50h of the primary brake system 16. A portion of the fluid flows through the final conduits 52a,52b such that the rear brake units 54a,54c are actuated, and another portion of the fluid flows through the outlet conduits 56a,56b into the secondary brake system 18. When the primary brake system 16 is operating, the secondary brake system 18 is inactive. When the secondary brake system 18 is inactive, the fluid flowing through the outlet conduits 56a,56b passes through the isolation valves 62a,62b, and flows through the cut-valve downstream conduits 112a,112b and to the front right brake unit 54c and the front left brake unit 54d to generate a braking force. The piston 28 is moved in either the first direction to decrease braking force or the second direction to increase braking force.

A second mode of operation occurs if there is a failure anywhere in the primary brake system 16, the secondary brake system 18 is then activated. The failure in the primary brake system 16 may be a result of failure of the actuator 22, a failure in the first vehicle controller 12, the primary controller 140, or some other component in the primary brake system 16. The second vehicle controller 14 receives the input from the devices in a similar manner to the first vehicle controller 12 as described above, and responds by sending commands to the secondary controller 136. When the secondary brake system 18 is activated, the secondary controller 136 configures the isolation valves 62a,62b to be in a closed position, preventing fluid from passing back into the outlet conduits 56a,56b. Each of the reservoirs 96a,96b receive fluid from the reservoir 32, and the secondary controller 136 controls the motor 104, to thereby control each of the pumps 102a,102b. Each of the low-pressure feed valves 98a,98b controls the flow of fluid from the corresponding reservoirs 96a,96b to each pump 102a,102b, and the excess pressure relief valves 106a,106b relieve pressure in the cut-valve downstream conduits 112a,112b to keep the pressure in the cut-valve downstream conduits 112a,112b below a desired level.

The secondary brake system 18 is able to supply fluid pressure such that only the front braking units 54c,54d are used to decelerate the vehicle. There are some situations where the vehicle may need to be stopped quickly, such that when there is a low-level deceleration command from the secondary controller 136, the pumps 102a,102b and the motor 104 do not generate enough pressure for the braking units 54c,54d to generate a braking force which sufficiently decelerates the vehicle. According the present invention, when the secondary brake system 18 is active, and the vehicle needs to be stopped quickly, the secondary controller 136 generates a high-level deceleration command, such that the motor 104 and pumps 102a,102b generate a boost pressure in the cut-valve downstream conduits 112a,112b and therefore the front right brake unit 54c and the front left brake unit 54d generate a braking force, this boost pressure allows for the braking units 54c,54d to provide deceleration capability that is equivalent to braking capability achievable by the primary braking system 16, such that the two front braking units 54c,54d providing the equivalent deceleration capability as all four braking units 54a,54b,54c,54d when all four braking units 54a,54b,54c,54d are controlled by the primary controller 140.

The operation of the motor 102 and pumps 102a,102b by the secondary controller 136 functions as an "on-demand" feature, which may be operated at any time there is a request for aggressive deceleration of the vehicle.

The boost pressure functionality of the present invention may be applied to a vehicle which may be operated by a driver but has autonomous driving capability, and is also suitable for a fully autonomous driving vehicle, where the vehicle never receives any input from a driver.

In an embodiment where the vehicle may be operated by a driver, such as a large truck, and also has autonomous driving capability, if there is a failure in the primary brake system 16, the secondary brake system 18 is activated, and the boost pressure is generated in the cut-valve downstream conduits 112a,112b as previously described. The driver of the vehicle is still able to apply force to the brake pedal 78. However, because the primary brake system 16 is not functioning, the actuator 22 may be malfunctioning, one or more of the valves 44a,44b,48a,48b,50a,50b,50c,50d,50e, 50f,50g,50h may be malfunctioning, such that there is no additional pressure provided by the actuator 22 to the braking units 54a,54b. The force applied to the brake pedal 78 generates pressure in the various conduits. Because the isolation valves 62a,62b are in a closed position, all of the fluid in the primary brake system that is pressurized by the force applied to the brake pedal 78 by the driver causes pressure to be applied to only the first and second braking units 54a,54b, generating braking force in the first and second braking units 54a,54b. The braking force applied to the first and second braking units 54a,54b is supplemented by the braking force in the third and fourth braking units 54c,54d, such that the vehicle is able to be stopped quickly. Additionally, in this embodiment, because the force applied to the brake pedal 78 only generates fluid pressure in the primary brake system 16, less force is required by the driver to be applied to the brake pedal 78, and less distance is travelled by the brake pedal 78 to generate pressure in the primary brake system 16.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a braking system for a vehicle, including:
   a primary brake system;
   a secondary brake system;
   a plurality of braking units controlled by the primary brake system when the primary brake system is active, at least one of the plurality of braking units controlled by the secondary brake system when the primary brake system is inactive and at least one of the plurality of braking units is fluidly connected to the primary brake system and fluidly isolated from the secondary brake system;
   an actuator for pressurizing fluid, such that the pressurized fluid is transferred to the plurality of braking units when the primary brake system is active; and
   at least one virtual driver in electrical communication with the primary brake system and the secondary brake system, such that when the vehicle is operating in an autonomous driving mode, the at least one virtual driver controls the primary brake system, and controls the secondary brake system when the primary brake system is inactive;
   a boost pressure which is generated by the secondary brake system when the primary brake system is inactive;
   wherein the actuator controls the fluid pressure in the primary brake system to selectively actuate the plurality of braking units when the primary brake system is active, and when the primary brake system is inactive, the secondary brake system generates the boost pressure in the at least one of the plurality of braking units controlled by the secondary brake system.

2. The apparatus of claim 1, the secondary brake system further comprising:
   a motor;
   at least one pump connected to the motor, the at least one pump operable for generating the boost pressure to the at least one of the plurality of braking units;
   wherein the motor and the at least one pump generate the boost pressure to the at least one of the plurality of braking units controlled by the secondary brake system when the primary brake system is inactive.

3. The apparatus of claim 1, further comprising:
   a brake pedal, the brake pedal being part of the primary brake system;
   wherein when the primary brake system is active, the driver of the vehicle applies force to the brake pedal, and the actuator generates a corresponding braking pressure such that the plurality of braking units are actuated, decelerating the vehicle.

4. The braking system for a vehicle of claim 3, further comprising:
   a first braking unit being part of the plurality of braking units;
   a second braking unit being part of the plurality of braking units;
   a third braking unit being part of the plurality of braking units; and
   a fourth braking unit being part of the plurality of braking units;
   wherein the first braking unit, the second braking unit, the third braking unit, and the fourth braking unit are all controlled by the primary brake system when the primary brake system is active, and when the primary brake system is inactive, the secondary brake system controls the third braking unit and the fourth braking unit and the driver of the vehicle applies force to the brake pedal to actuate the first braking unit and the second braking unit.

5. The braking system for a vehicle of claim 4, wherein the driver of the vehicle applies force to the brake pedal to generate pressure in the primary brake system such that the first braking unit and the second braking unit are actuated, and the braking force of the first braking unit and second braking unit is combined with braking force generated by the third braking unit and the fourth braking unit during operation of the secondary brake system, when the secondary brake system is active and the primary brake system is inactive.

6. The apparatus of claim 4, further comprising a first parking brake unit controlled by the secondary brake system and associated with the first braking unit.

7. The apparatus of claim 6, further comprising a second parking brake unit controlled by the secondary brake system and associated with the second braking unit.

8. The apparatus of claim 1, wherein the at least one of the plurality of braking units is fluidly connected to the primary brake system and fluidly isolated from the secondary brake system when the primary brake system is active and when the primary brake system is inactive.

9. A braking system for a vehicle, comprising:
   a primary brake system including a brake pedal;
   a secondary brake system;
   a plurality of braking units including a first braking unit, a second braking unit, a third braking unit, and a fourth braking unit controlled by the primary brake system when the primary brake system is active, at least one of the plurality of braking units controlled by the secondary brake system when the primary brake system is inactive;
   a primary controller controlling fluid pressure in the primary brake system;

a secondary controller controlling fluid pressure in the secondary brake system independently of the primary controller;

an actuator being part of the primary brake system, the actuator controlled by the primary controller;

a reservoir in fluid communication with both the primary brake system and the secondary brake system; and a boost pressure which is generated by the secondary brake system when the primary brake system is inactive;

wherein the primary controller actuates the actuator to control the fluid pressure in the primary brake system to selectively actuate the first, second, third, and fourth braking units when the primary brake system is active and the secondary brake system is inactive, and when the primary brake system is inactive, the secondary brake system is active and the secondary controller is configured to generates the boost pressure in the third braking unit and the fourth braking unit to generate braking force and the driver of the vehicle applies force to the brake pedal to generate braking pressure in the first braking unit and the second braking unit.

10. The braking system for a vehicle of claim 9, the secondary brake system further comprising:

a motor; and at least one pump connected to the motor, the at least one pump operable for generating the boost pressure to the at least one of the plurality of braking units;

wherein the motor and the at least one pump generate the boost pressure to the at least one of the plurality of braking units controlled by the secondary brake system when the primary brake system is inactive.

11. The braking system for a vehicle of claim 10, wherein the secondary controller commands the motor and the at least one pump to generate the boost pressure independently of the amount of force applied to the brake pedal, when the primary brake system is inactive.

12. The braking system for a vehicle of claim 9, wherein when the primary brake system is active, the driver of the vehicle applies force to the brake pedal to generate braking pressure such that the plurality of braking units are actuated, decelerating the vehicle.

13. The braking system for a vehicle of claim 9, the vehicle further comprising a fully autonomous driving vehicle.

14. The braking system for a vehicle of claim 13, further comprising:

at least one virtual driver;

wherein the virtual driver provides input to the primary controller to operate the primary brake system when the primary brake system is active, and the secondary controller receives input from the at least one virtual driver when the primary brake system is malfunctioning.

15. The apparatus of claim 9, further comprising a first parking brake unit controlled by the secondary controller and associated with the first braking unit and wherein at least one of the plurality of braking units is fluidly connected to the primary brake system and fluidly isolated from the secondary brake system.

16. The apparatus of claim 15, further comprising a second parking brake unit controlled by the secondary controller and associated with the second braking unit.

17. The apparatus of claim 9, wherein the at least one of the plurality of braking units is fluidly connected to the primary brake system and fluidly isolated from the secondary brake system when the primary brake system is active and when the primary brake system is inactive.

18. A braking system for a vehicle, comprising:

a primary brake system including a brake pedal;

a secondary brake system;

a plurality of braking units including a first braking unit, a second braking unit, a third braking unit, and a fourth braking unit controlled by the primary brake system when the primary brake system is active, at least one of the plurality of braking units controlled by the secondary brake system when the primary brake system is inactive;

a primary controller controlling fluid pressure in the primary brake system;

a secondary controller controlling fluid pressure in the secondary brake system independently of the primary controller;

an actuator being part of the primary brake system, the actuator controlled by the primary controller;

a reservoir in fluid communication with both the primary brake system and the secondary brake system; and a boost pressure which is generated by the secondary brake system when the primary brake system is inactive;

a first mode of operation, and during the first mode of operation, the primary brake system is active such the first braking unit, the second braking unit, the third braking unit, and the fourth braking unit are all controlled by the primary controller and the driver of the vehicle applies force to the brake pedal to generate braking pressure such that the plurality of braking units are actuated, decelerating the vehicle, while the secondary brake system is inactive; and a second mode of operation, and during the second mode of operation, the secondary brake system is active such that the secondary controller controls the third braking unit and the fourth braking unit, and the primary brake system is inactive;

wherein the primary controller selectively actuates the actuator to control the fluid pressure in the primary brake system to selectively actuate the plurality of braking units when the primary brake system is active, and when the primary brake system is inactive, the secondary brake system generates the boost pressure in the at least one of the plurality of braking units controlled by the secondary brake system;

wherein during the second mode of operation, the driver of the vehicle applies force to the brake pedal to generate braking pressure such that the first braking unit and the second braking unit are actuated to generate braking force, and the secondary controller configures the secondary brake system to generate the boost pressure to actuate the third braking unit and the fourth braking unit to generate braking force, and the braking force of the first braking unit and the second braking unit is combined with the braking force generated by the third braking unit and the fourth braking unit to decelerate the vehicle.

19. The apparatus of claim 18, further comprising a first parking brake unit controlled by the secondary controller and associated with the first braking unit, a second parking brake unit controlled by the secondary controller and associated with the second braking unit, and at least one of the plurality of braking units is fluidly connected to the primary brake system and fluidly isolated from the secondary brake system.

20. The apparatus of claim 18, wherein the at least one of the plurality of braking units is fluidly connected to the primary brake system and fluidly isolated from the secondary brake system when the primary brake system is active and when the primary brake system is inactive.

\* \* \* \* \*